United States Patent [19]
Ebihara et al.

[11] Patent Number: 5,253,063
[45] Date of Patent: Oct. 12, 1993

[54] APPARATUS WHICH EMPLOYS THE VARIABLE WEIGHING COEFFICIENTS FOR A TRANSVERSAL FILTER AND A SINGULAR LINE MEMORY TO COMPENSATE FOR GHOST IN IMAGE SIGNALS

[75] Inventors: Kazuyuki Ebihara; Tatsushi Koguchi; Yuji Nishi; Shigehiro Ito, all of Ibaraki, Japan

[73] Assignee: Victor Company of Japan, Ltd., Yokohama, Japan

[21] Appl. No.: 850,795

[22] Filed: Mar. 13, 1992

[30] Foreign Application Priority Data

Mar. 14, 1991 [JP] Japan .................................. 2-74807

[51] Int. Cl.$^5$ .............................................. H04N 5/213
[52] U.S. Cl. .................................... 358/167; 358/905
[58] Field of Search ............... 358/167, 905, 166, 36, 358/37

[56] References Cited

U.S. PATENT DOCUMENTS

| | | | |
|---|---|---|---|
| 4,897,725 | 1/1990 | Tanaka et al. | 358/167 |
| 5,025,317 | 6/1991 | Koguchi et al. | 358/905 |
| 5,065,241 | 11/1991 | Iga | 358/167 |
| 5,099,328 | 3/1992 | Kobo et al. | 358/905 |
| 5,130,799 | 7/1992 | Iga et al. | 358/905 |
| 5,144,414 | 9/1992 | Nishi et al. | 358/905 |
| 5,161,017 | 11/1992 | Sato | 358/166 |

Primary Examiner—James J. Groody
Assistant Examiner—John W. Miller
Attorney, Agent, or Firm—Jacobson, Price, Holman & Stern

[57] ABSTRACT

A ghosting cancel apparatus which can reduce the circuit scale through the use of a one-line memory to remove ghosting, comprises an A/D conversion circuit, a timing signal generation circuit, a one-line memory, a field number register, a calculation processing circuit, a transversal filter, and a D/A conversion circuit. The timing signal generation circuit supplies ghost cancel reference (GCR) field numbers to the field number register, write enable signal to the one-line memory, and read enable signals to a microprocessor inside the calculation processing apparatus. When the one-line memory receives write enable signals, and extracts GCR basic signals from the transversal filter to store them. When the microprocessor receives the read enable signals, and stores it in the waveform memory inside the calculation processing apparatus. The microprocessor performs calculation processing for compensation signals as a weighting coefficient for the transversal filter and sets and supplies it and as a result, removes ghosting from image signals.

6 Claims, 4 Drawing Sheets

APPARATUS WHICH EMPLOYS THE VARIABLE WEIGHING COEFFICIENTS FOR A TRANSVERSAL FILTER AND A SINGULAR LINE MEMORY TO COMPENSATE FOR GHOST IN IMAGE SIGNALS

BACKGROUND OF THE INVENTION

The present invention relates to a ghost cancel apparatus for cancelling wavelength distortion or ghost, and which is used in various types of imaging devices such as television receivers and the like, that handle television image signals.

In recent years, a number of methods for ghost cancelling in television systems have been proposed. Almost all of them provide reference signals inserted into the television signals, for ghost detecting and/or ghost cancelling. In receiving, the degree of ghost occurred in TV transmission is detected by a difference between received reference signals and the standard reference signals, and then, variable co-efficients of an equalizer, for example a transversal filter, are adjusted for ghost cancelling. In these procedure, the detection of ghost is the key to correct cancelling. For this purpose, in the television signal now broadcasted in Japan, two types of waveforms are employed. One is "0" pedestal level and another is a GCR (Ghost Cancel Reference) which are inserted alternately onto the 18th and the 281st line of the vertical blanking period. The insertion order of these two waveform is repeated every 8 fields.

In FIG. 1, the image signals that are supplied from an input terminal, are input to an analog/digital (A/D) converter circuit 1 and are simultaneously input to a timing signal generation circuit 4. The image signals that have been input to the A/D converter circuit 1 are converted into digital data, and are supplied to a digital transversal filter 2 (hereinafter simply termed a transversal filter). The timing generation circuit 4 generates timing signals for writing the GCR signals which have been converted into digital data, to a line memory 5 which is a high-speed memory.

Here, the line memory 5 has an 8-line memory block spanning from a line memory 50 to a line memory 57. The GCR signals which have been converted into digital data, are extracted from the transversal filter 2 by reference signal period sample signals which are the timing signals generated by the timing signal generation circuit 4. By addressing signals which indicate to which portion of the 8-line memory block of line memory 5 (line memory 50 to line memory 51) the GCR signals are stored in the line memory 5.

The following is a description of the GCR signals for the detection of waveform distortion such as ghost and the like in input image or video signals, with reference to FIGS. 2(a)-(c). The GCR signals are composed of "0" pedestal signals shown in FIG. 2(b) and the GCR signals shown in FIG. 2(a), and are sent by an 8-field sequence shown in Table 1. For example, field number 1 has the pedestal signal for the 18th line GCR signal sent to it, and field number 2 has the 281st line GCR signal sent to it. The order of storage in the line memory 5 is in accordance with this field sequence.

A GCR subtraction circuit 7 performs subtraction processing (GCR signal—"0" pedestal signal) for the data of the 4-field difference, and generates reference signals shown in FIG. 2(c) from which the burst signals and the sync signals have been cancelled, and supplies the reference signals to a calculation processing apparatus 6 having a microprocessor, a work memory and a program memory. The reference signals that have been read by the microprocessor inside the calculation processing apparatus 6 are added and averaged a required number of times, and the averaged reference signals are differentiated by a differentiating filter not shown in the figure, inside the calculation processing filter 6, and the influence of a direct current (DC) portion is removed.

Then, the microprocessor inside the calculation processing apparatus 6 compares (subtracts) the waveform which serves as the reference, which has been set beforehand inside the microprocessor, with those reference signals, and performs calculation processing on the basis of the comparison results. The results are multiplied by a required multiplication factor and the multiplication factor is applied to the calculation results so that a weighting (compensation coefficient) is set to the transversal filter 2. The set weighting is applied to the transversal filter 2 and ghost is removed (reduced) from the image signals. These image signals which have had ghost removed (reduced), are returned to analog data by a digital/analog (D/A) conversion circuit 3 for output. This processing is performed several of times and ghost is removed from the image signals.

At this time, there can be provided feedback type control and feedforward type control. In feedback control, the image signals which are read from the output side of the transversal filter 2, are used as the basis for feedback control so that the weighting of the transversal filter 2 is successively renewed. In feedforward control, the image signals read from the input side of the transversal filter 2, are used as the basis for determining a weighting of the transversal filter 2. The ghost cancel apparatus shown in FIG. 1 is for feedback type control.

When the image signals are converted into digital data by the A/D conversion circuit 1, the sampling rate for the conversion is high speed (and in the example shown in FIG. 1, the data are sampled at 14.3 MHz), and it is difficult for the data to be directly taken into a low-speed and large-capacity memory used by the microprocessor. In addition, it is also necessary to have simultaneous management for the data which is incorporated for the difference calculation for the obtained data because the GCR subtraction circuit 7 described above first extracts the reference signals by subtraction processing for the data of the 4-field difference.

In order to satisfy these conditions, it is necessary to have an 8-line portion for the high-speed line memory and so the scale of the circuit necessarily large. Alternatively, in order to reduce the scale of the circuit, there is a method in which, of the 8-field sequence, only the 4 fields of the first half, or only the first two fields are, but there is a small number of data taken and the ghost detection sensitivity becomes duller because there is a small number of sampling data. The disadvantage crises

TABLE 1

| insertion number | 1 | 2 | 3 | 4 | 5 | 6 | 7 | 8 |
|---|---|---|---|---|---|---|---|---|
| insertion line | 18 | 281 | 18 | 281 | 18 | 281 | 18 | 281 |
| signal | GCR | 0 | GCR | 0 | 0 | GCR | 0 | GCR | that there is a lowering of the processing speed for ghost removal.

SUMMARY OF THE INVENTION

It is an object of the present invention to provide a ghost cancel apparatus which has the same functions as a conventional ghost cancellation apparatus and that uses a high-speed one-line memory, and more specifically, provides for ghost detection sensitivity, embodied in a compact circuit manufactured of a reduced.

In order to eliminate the disadvantages of the conventional technology, the present invention is designed to provide a ghost cancellation apparatus that cancels ghost through the use of GCR reference signals for ghost cancellation which have been inserted in the image signals, and that comprises an A/D conversion circuit for converting input image signals into digital data, a transversal filter for performing a required weighting so that ghost is cancelled from the image signals that have been converted into digital data by the A/D conversion circuit, a D/A conversion circuit for converting into analog data the digital data that have had the ghost cancelled and which are output from the transversal filter, a calculation processing apparatus for performing calculation processing for the weighting with respect to the transversal filter and sets the weighting in the transversal filter, a one-line memory for extracting at a required constant period signals including the GCR reference signals from the transversal filter for storage, a timing signal generation circuit for generating GCR field numbers from the input image signals, write enable signals to the one-line memory, and read enable signals to the calculation processing apparatus, and a field number register for storing the GCR field numbers, and wherein the calculation processing apparatus receives the write enable signals supplied from the timing signal generation circuit so that the GCR field numbers and data stored in the one-line memory are read, and calculation processing is performed for the weighting with respect to the transversal filter.

As mentioned above, with the ghost cancel apparatus of the present invention, it is possible to access at a high-speed the one-line memory that conventionally required an 8-line portion. That only a one-line memory is needed reduces the circuit scale as well as the cost. At the same time the processing the speed for ghost detection is not decreased nor is there any dulling of the ghost detection sensitivity.

DETAILED DESCRIPTION OF THE PREFERRED EMBODIMENTS

Figure 1:
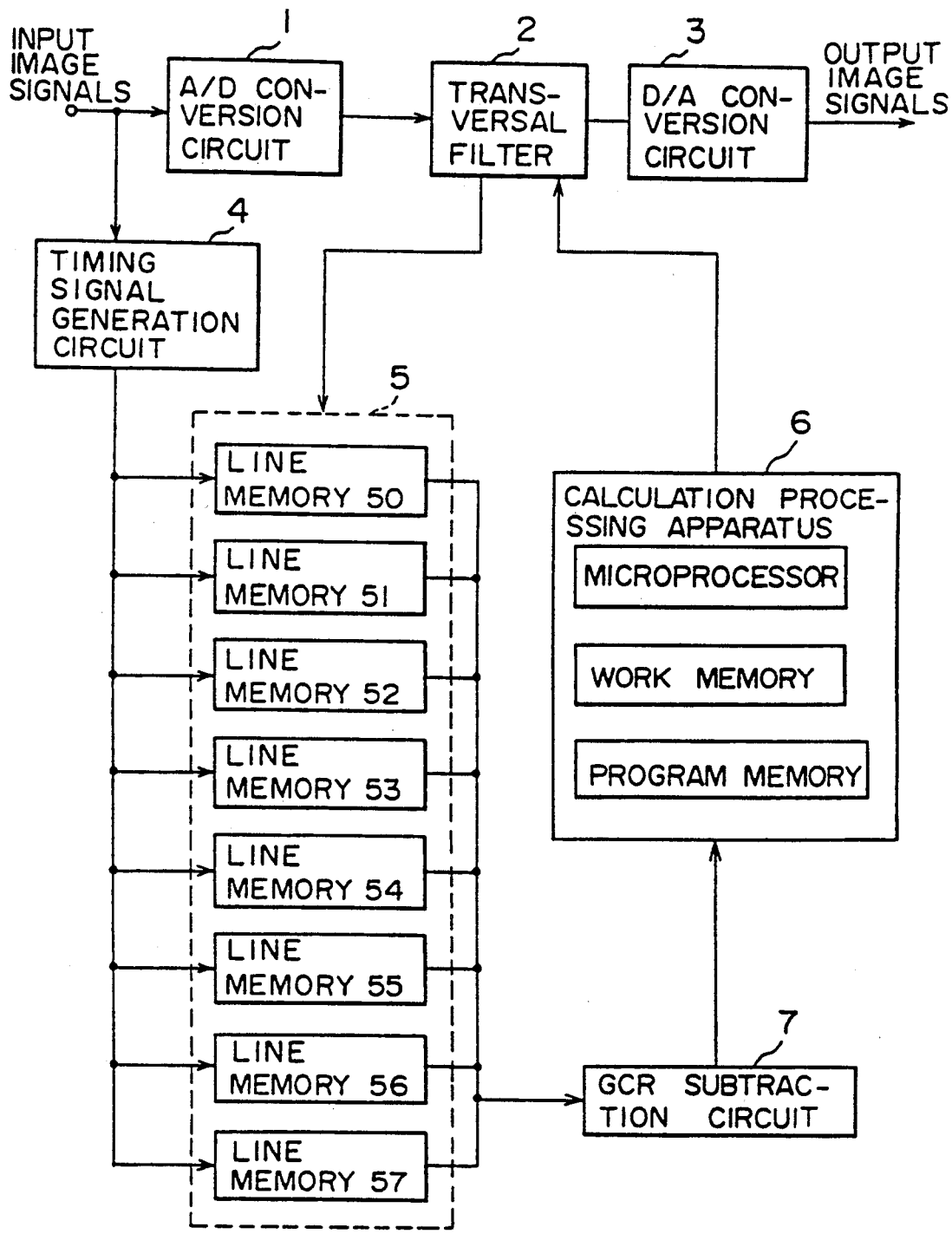
FIG. 1 is a block diagram showing an outline configuration of a conventional ghost cancel apparatus for use in an imaging device.
Figure 2:
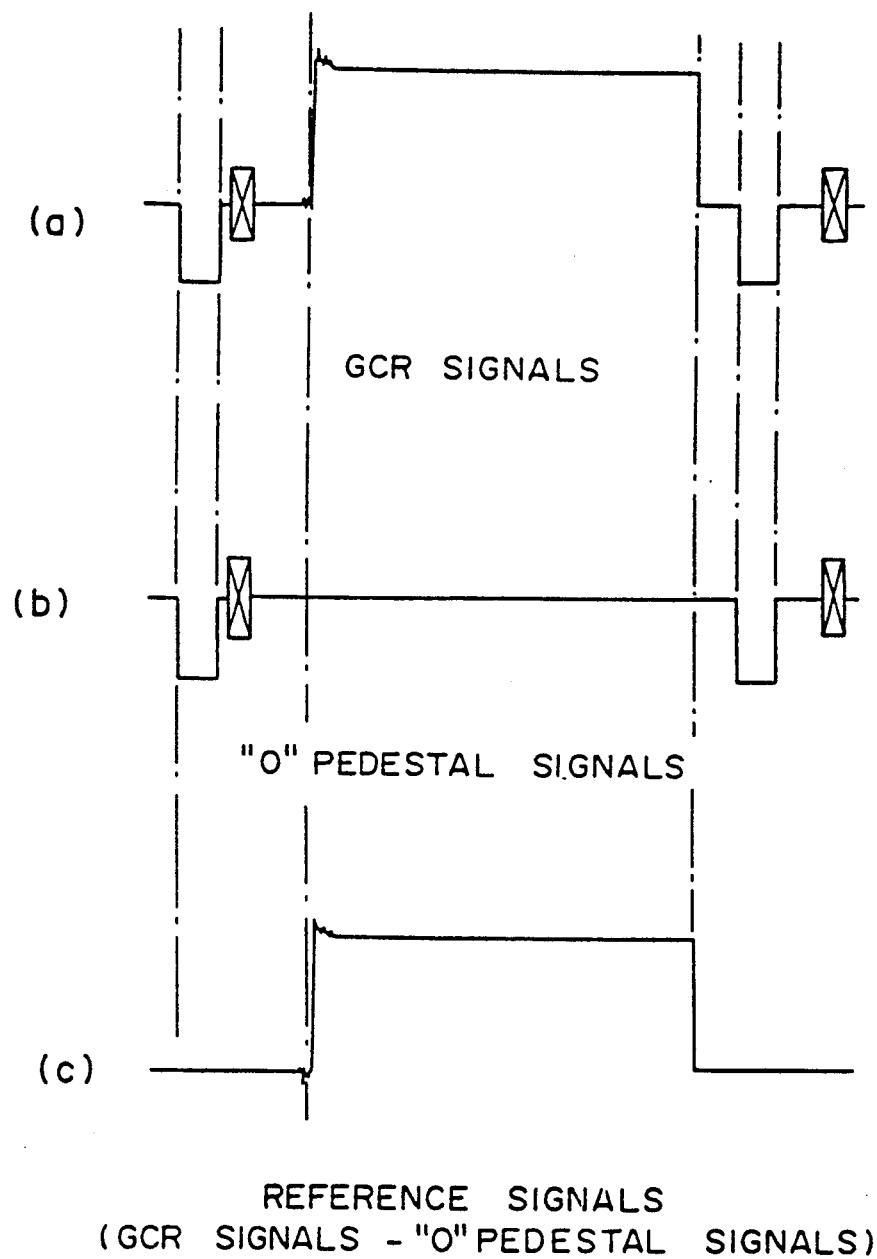
FIGS. 2(a)-(c) are waveform diagrams for describing the timing of ghost cancel reference (GCR) signals, "0" pedestal signals and reference signals, respectively.
Figure 3:
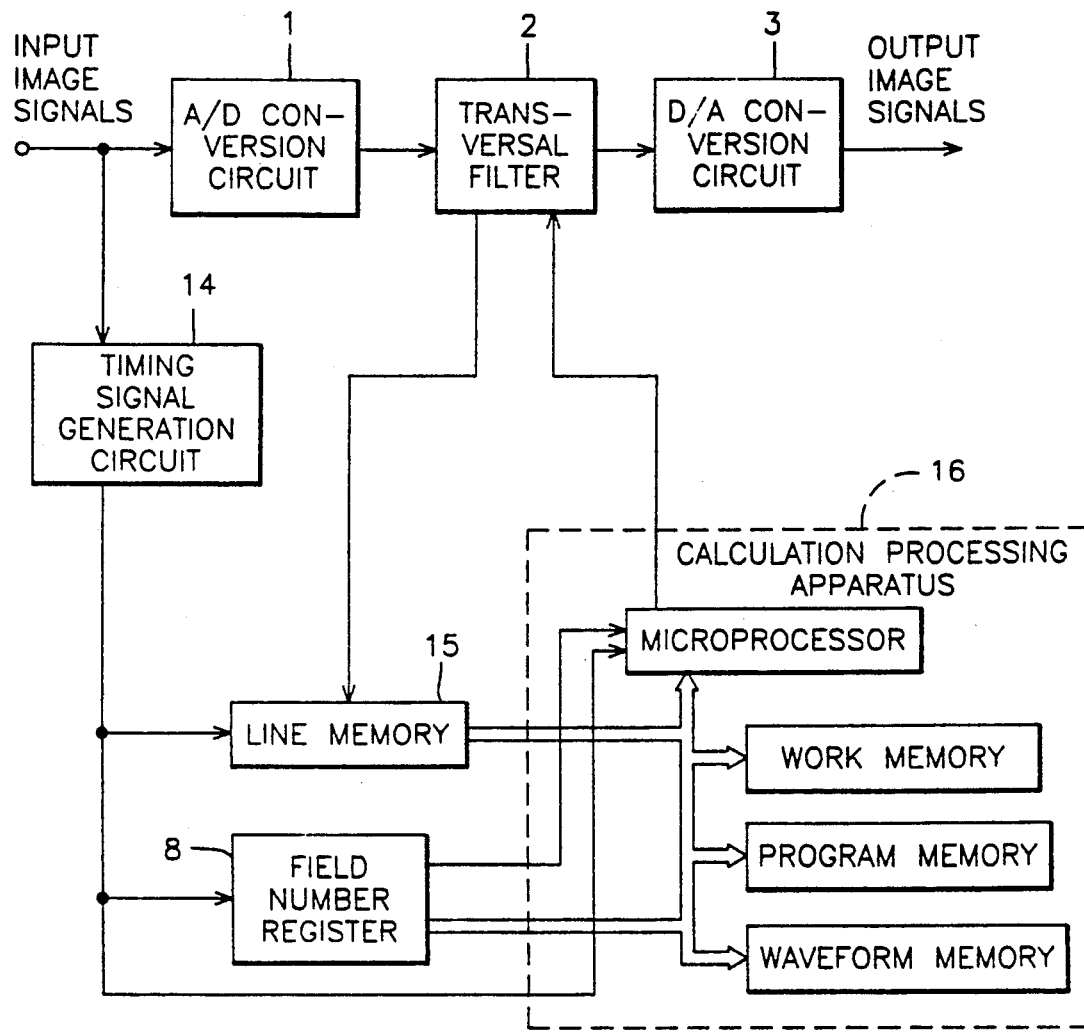
FIG. 3 is a block diagram showing an outline configuration of a ghost cancel apparatus according to one embodiment of the present invention.
Figure 4:
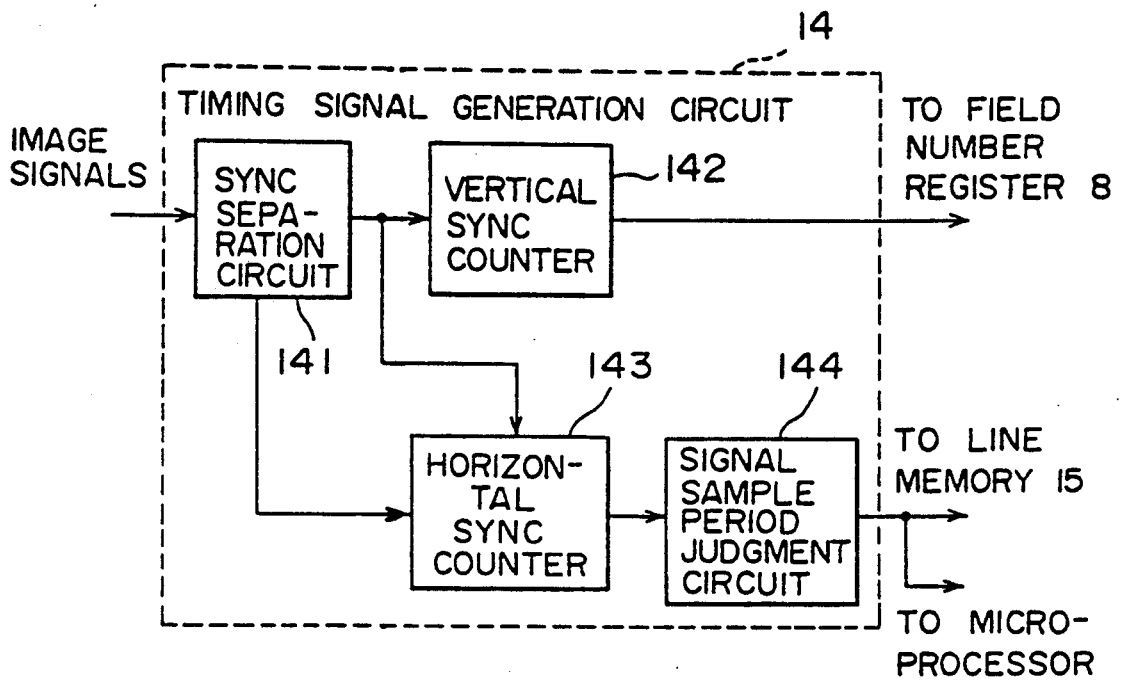
FIG. 4 is a block diagram showing a configuration of a timing signal generation circuit of the ghost cancel apparatus shown in FIG. 3.

The following is a description of a ghost cancel apparatus of the present invention, with reference to the appended drawings. FIG. 3 is a block diagram showing an outline configuration of a ghost cancel apparatus according to one embodiment of the present invention, and FIG. 4 is a block diagram showing a configuration of a timing signal generation circuit of the ghost cancel apparatus shown in FIG. 3. In this figure, those portions that correspond to portions of FIG. 1 are indicated with corresponding numerals, and the corresponding description thereof is omitted.

In FIG. 3, simultaneous with the input to the A/D conversion circuit 1 of the image signals supplied from the input terminal, input is also made to the timing signal generation circuit 14. The operation of the A/D conversion circuit 1 is the same as that for a conventional circuit. The timing signal generation circuit 14 generates timing signals that are to be described hereinafter. These timing signals are supplied to the line memory 15 which is a high-speed memory, the field number register 8 and to the microprocessor inside the calculation processing apparatus 16. Here, the line memory 15 is a FIFO (First In First Out) device.

The following is a description of the configuration and operation of the timing signal generation circuit 14, with reference to FIG. 4. The timing signal generation circuit 14 is configured from a sync separation circuit 141, a vertical sync counter 142, a horizontal sync counter 143 and a signal sample period judgment circuit 144. In the sync separation circuit 141, the input image signals that include sync signals are separated into horizontal sync signals and vertical sync signals. The separated horizontal sync signals are input to the horizontal sync counter 143 and the vertical sync signals are input to the vertical counter 142 that manages the field number register 8 and are also input to the horizontal sync counter 143 and are used as reset signals for the horizontal sync counter 143.

The GCR field number that is generated by the field signals that are taken from the image signals and the vertical sync counter 142 are set in the field number register 8 and are always in the status where they are read from the microprocessor inside the calculation processing apparatus 16. In addition, the period judgment signals generated by the horizontal sync counter 143 are supplied to the signal sample period judgment circuit 144 and the signal sample period judgment circuit 144 applies the write enable signals to a line memory 15, and read enable signals to the microprocessor inside the calculation processing apparatus 16. The write enable signal with respect to the line memory 15 extracts the image signals that have been converted into digital data by the A/D conversion circuit 1 for only a certain required period (such as one scan line period) that includes the GCR signals, and stores them in the line memory 15.

Figure 5:
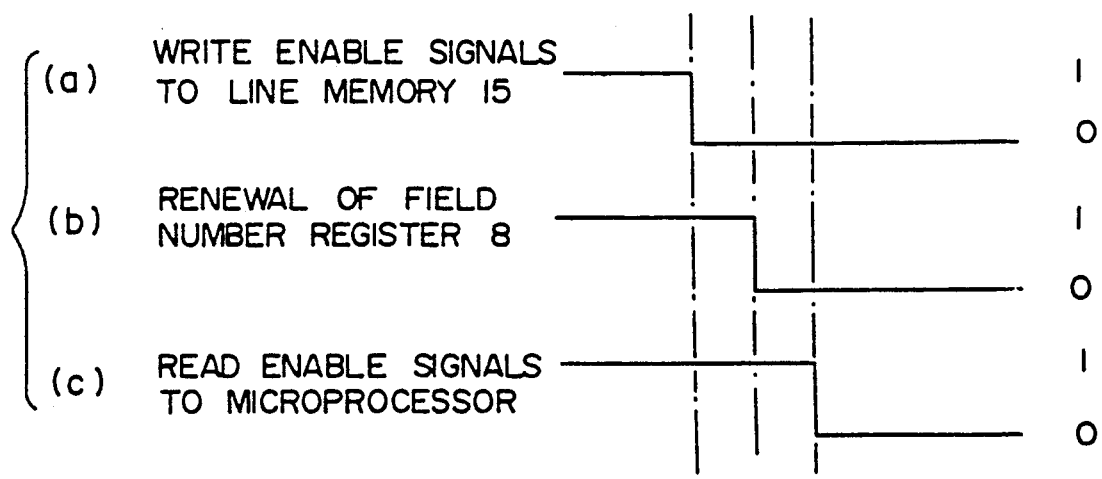
FIGS. 5(a)-(c) are timing charts for describing the data write timing in the ghost cancel apparatus shown in FIG. 3.

As shown in the timing charts of FIGS. 5(a) through 5(c), after the generation of the write enable signals to the line memory 15 (i.e. after the level changes from 1 to 0), the value of the field number register 8 is renewed and the write enable signals are sent to the microprocessor inside the calculation processing apparatus 16. Moreover, the write enable signals to the line memory 15 shown in FIG. 5(a), the renewal of the field number register 8 of FIG. 5(b) and the read enable signals to the microprocessor 15 of FIG. 5(a) are all valid for logic 0. The microprocessor takes the read enable signals from the signal sample period judgment circuit 144 and then reads the GCR field number that has been set in the field number register 8, and stores the GCR field number and the data that have been stored in the line memory 15, in the appropriate area of the waveform memory inside the calculation processing apparatus 16 and which is waveform managed by the apparatus 16. This waveform memory is a low-speed, large-capacity memory that is used by a conventional microprocessor.

Here, the waveform memory inside the calculation processing apparatus 16 stores the past data (values of GCR field numbers and GCR signals corresponding to 5 fields) for the portion necessary for ghost cancel processing, and the newly read data from the line memory 15 are swapped with the oldest data inside the waveform memory. Then, the data that is stored in the waveform memory is combined and in accordance with the field sequence, the microprocessor performs subtraction processing for the 4-field difference, and generates reference signals for which burst signals and sync signals have been cancelled. Moreover, in addition, the calculation processing apparatus 16 is provided with a work memory and a program memory.

Furthermore, the microprocessor compares (subtracts) those reference signals with the waveform that becomes a reference which is set beforehand, performs calculation processing on the basis of the results of the comparison, multiplies them by a required multiplication factor, and applies that multiplication factor to those subtraction results to set a weighting (compensation coefficient) to the transversal filter 2. This set weighting is applied to the transversal filter 2 and the ghost in the image signals is cancelled or reduced. The image signals for which there has been ghost cancel or reduction are returned to analog data by the D/A conversion circuit 3 so as to be outputted. This processing is performed several times to cancel the ghost from the image signals.

Moreover, reading data from the line memory 15 and reading data from the waveform memory for ghost cancel, are performed independently of each other by the microprocessor. However, the field number register 8 is set and so it is possible to always judge when the newest data has been taken into the waveform memory. Because of this, it is possible to perform ghost cancel calculations in consideration of combinations of the newest data. Furthermore, even if there is missing data because of deterioration of burst signals (such as random noise and the like), the microprocessor is managed by the field number register 8 external to the calculation processing apparatus 16 and so the horizontal sync counter 143 is reset by the vertical sync signal which is a reset signal and so no contradictions occur in the field sequence of the GCR signals and the image signals.

In addition, the microprocessor reads data immediately after data has been written to the line memory 15 but the speed for reading data is slower than the speed for writing data to the line memory 15 and so there is no overtake of the written data.

Furthermore, the timing of the read operation from the line memory 15 by the microprocessor is fixed and it is possible to refer to the field number register 8. Therefore, the processing time for ghost removal can be minimized, and there is minimal increase in the ghost processing time as compared with the conventional apparatus, and it is possible to achieve high-speed ghosting cancellation.

What is claimed is:

1. An apparatus for cancelling ghost which occurs in a screen of an imaging device by using ghost cancel reference (GCR) signals for a ghost cancel reference, which have been inserted in image signals, comprising:
    an A/D conversion circuit for converting input analog image signals into digital image signals;
    a timing signal generation circuit for generating GCR field numbers, write enable signals, and read enable signals, respectively, in response to said input analog image signals;
    a one-line memory for extracting predetermined period data of a constant time period including said GCR signals from said digital image signals, corresponding to said write enable signals which are supplied from said timing signal generation circuit, and for storing said predetermined period data.
    a field number register for storing said GCR field number which is supplied from said timing signal generation circuit;
    a calculation processing apparatus for generating compensation signals for removing ghost from said digital image signals by calculation after respectively reading said predetermined period data from said one-line memory and said GCR field numbers from said field number register, in response to said read enable signals which are supplied from said timing signal generation circuit;
    a transversal filter for removing ghost in said digital image signals by means of predetermined weighing to said digital image signals by said compensation signals which are supplied from said calculation processing apparatus;
    a D/A conversion circuit for converting said digital image signals after removing ghost, which are outputted from said transversal filter, to analog image signals; and
    wherein said timing signal generation circuit comprises:
    a sync separation circuit for separating said analog signals into vertical sync signals and horizontal sync signals;
    a vertical sync counter for counting said vertical sync signals which are separated and output from said sync separation circuit, and for supplying counted vertical sync signals as said GCR field number to said field number register;
    a horizontal sync counter for counting said horizontal sync signals in a predetermined time period by using as reset signals said vertical sync signals which are output from said sync separation circuit, so as to generate period judgment signals; and
    a signal sample period judgment circuit for judging a signal sample period in response to said period judgment signals which are supplied from said horizontal sync counter, so as to output said write enable signals to said one-line memory and to output said read enable signals to said calculation processing apparatus.

2. The ghost cancel apparatus according to claim 1, wherein said calculation processing apparatus comprises:
    a microprocessor for outputting a value of said GCR field number and data stored in said one-line memory under read management after reading said GCR field number which is set in said field number register in response to said read enable signals which are supplied from said field number register; and a waveform memory for storing said value of said GCR field number which is read by said microprocessor and said data which is read from said one-line memory.

3. The ghost cancel apparatus according to claim 2, wherein:

said waveform memory is configured so that said GCR signal and a value of a GCR field number for five fields which are necessary for ghosting removal processing are always stored, and so that said microprocessor swaps oldest data stored in said memory with newest data read from said line memory by said microprocessor.

4. The ghost cancel apparatus according to claim 3, wherein:

said microprocessor is configured in the manner that the data which are stored in said waveform memory are combined, subtraction processing for a four-field difference is performed in accordance with a field sequence, and reference signals are generated which are cancelled burst signals and sync signals.

5. The ghost cancel apparatus according to claim 4, wherein:

said microprocessor is configured to average said reference signals over a required number of times and implements integral processing to convert waveforms.

6. The ghost cancel apparatus according to claim 5, wherein:

said microprocessor is configured to compare said reference signals with a reference waveform which has been set beforehand so as to generate comparison results, to perform further calculation to multiply by a required multiplication factor, and to apply the required multiplication factor to said comparison results to generate said compensation signals as a compensation coefficient which performs weighting to said transversal filter.

* * * * *